(12) United States Patent
Ikeda et al.

(10) Patent No.: US 9,959,891 B2
(45) Date of Patent: May 1, 2018

(54) METHOD FOR CORRECTING A MOUNTING POSITION OF A DISK DEVICE ON A RACK

(71) Applicant: KABUSHIKI KAISHA TOSHIBA, Tokyo (JP)

(72) Inventors: Toru Ikeda, Yokohama Kanagawa (JP); Isamu Tomita, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days. days.

(21) Appl. No.: 15/445,798

(22) Filed: Feb. 28, 2017

(65) Prior Publication Data
US 2018/0061443 A1 Mar. 1, 2018

(30) Foreign Application Priority Data
Aug. 23, 2016 (JP) ................................. 2016-162828

(51) Int. Cl.
*G11B 5/596* (2006.01)
*G11B 5/55* (2006.01)
*G11B 20/18* (2006.01)

(52) U.S. Cl.
CPC ............ *G11B 5/5547* (2013.01); *G11B 20/18* (2013.01)

(58) Field of Classification Search
CPC ........... G11B 5/012; G11B 27/36; G11B 5/02; G11B 2220/90; G11B 27/11; G11B 5/6005; G11B 5/59633; G11B 19/16; G11B 19/42; G11B 19/20; G11B 19/28; G11B 5/5547; G11B 21/083; G11B 5/5521; G11B 5/596; G11B 5/5552
USPC ... 360/137, 77.03, 79, 75, 25, 60, 69, 73.03; 700/280; 714/6.2; 702/56, 182
See application file for complete search history.

(56) References Cited

U.S. PATENT DOCUMENTS

| 5,721,816 | A | 2/1998 | Kusbel et al. | |
|---|---|---|---|---|
| 6,392,833 | B1 * | 5/2002 | Wood | G11B 19/28 360/69 |
| 6,665,633 | B2 | 12/2003 | Fioravanti et al. | |
| 7,469,571 | B2 * | 12/2008 | Taguchi | G11B 5/5582 73/11.04 |
| 8,810,945 | B2 | 8/2014 | Makino | |

* cited by examiner

*Primary Examiner* — Nabil Hindi
(74) *Attorney, Agent, or Firm* — Patterson & Sheridan, LLP

(57) ABSTRACT

A method for correcting a mounting position of a disk device on a rack, includes performing a normal seek to position a head of the disk device above a target position on the disk, determining that the normal seek has failed, and performing an excitation seek that causes a position of a base supporting the disk to move and reposition the disk. The disk device includes a carriage arm supporting the head, a voice coil motor configured to drive the carriage arm to position the head, the base supporting the magnetic disk, the voice coil motor, and the carriage arm, and a control unit configured to control a current to the voice coil motor to be supplied with a first current profile during the normal seek and with a second current profile during the excitation seek.

15 Claims, 13 Drawing Sheets

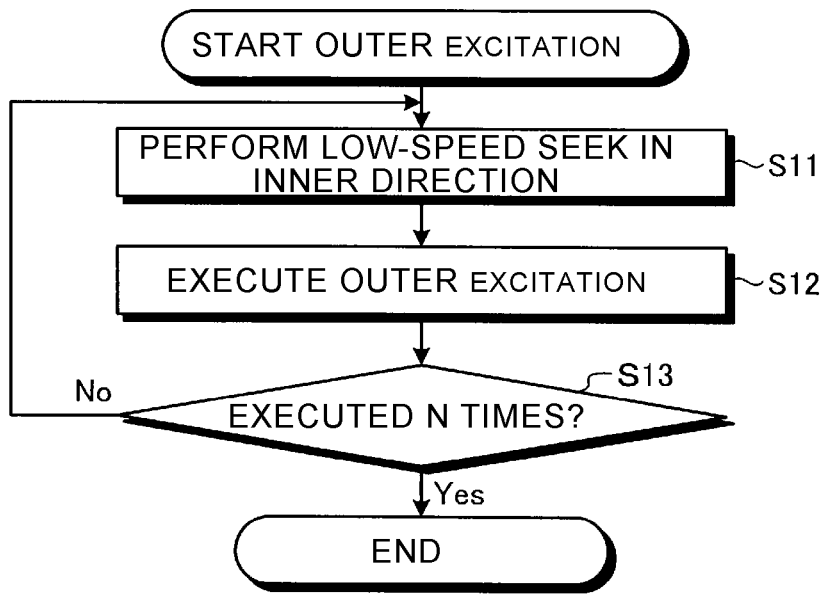
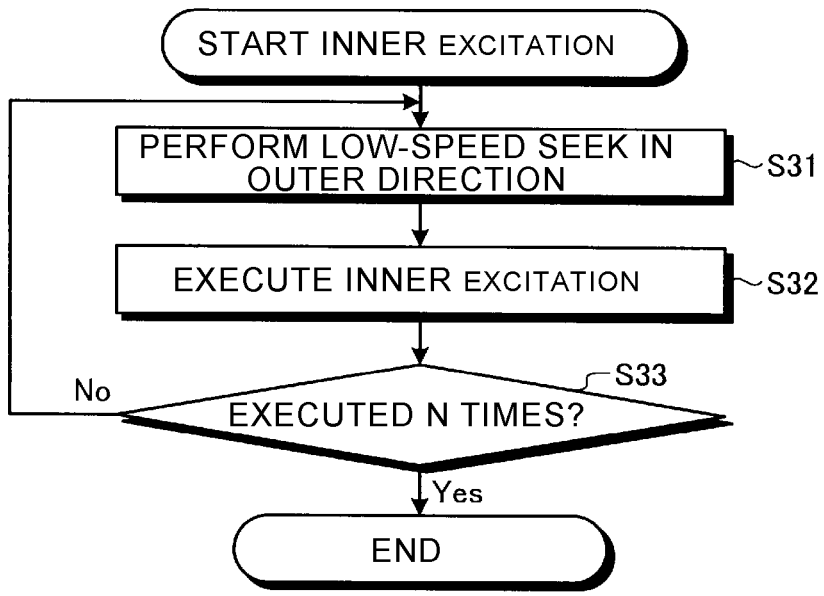

METHOD FOR CORRECTING A MOUNTING POSITION OF A DISK DEVICE ON A RACK

CROSS-REFERENCE TO RELATED APPLICATION

This application is based upon and claims the benefit of priority from Japanese Patent Application No. 2016-162828, filed Aug. 23, 2016, the entire contents of which are incorporated herein by reference.

FIELD

Embodiments described herein relate generally to a method for correcting a mounting position of a disk device on a rack.

BACKGROUND

A hard disk device (HDD) having a disk magnetically recording data is known as a disk device. In the HDD, the rotation of a magnetic disk causes vibration of the magnetic disk device, and as a result, an attachment member and the magnetic disk device may collide with each other. In such a case, a track servo may deviate at the time of writing data on the magnetic disk, and as a result, a write error may occur.

DESCRIPTION OF THE DRAWINGS

FIG. 8 is a flowchart illustrating an operation of the outer excitation of FIG. 7.

FIG. 9 is a flowchart illustrating an operation of the inner excitation of FIG. 7.

DETAILED DESCRIPTION

Embodiments provide a method for correcting a mounting position of a disk device on a rack.

In general, according to one embodiment, a method for correcting a mounting position of a disk device on a rack, includes performing a normal seek to position a head of the disk device above a target position on the disk, determining that write error has occurred, and performing an excitation seek that causes a position of a base supporting the disk to move and reposition the disk. The disk device includes a carriage arm supporting the head, a voice coil motor configured to drive the carriage arm to position the head, the base supporting the magnetic disk, the voice coil motor, and the carriage arm, and a control unit configured to control a current to the voice coil motor to be supplied with a first current profile during the normal seek and with a second current profile during the excitation seek.

Hereinafter, the method for correcting the attachment position of the disk device and the disk device according to the embodiments will be described in detail with reference to the accompanying drawings. Meanwhile, the preset invention is not limited by the embodiments.

First Embodiment

Figure 1:
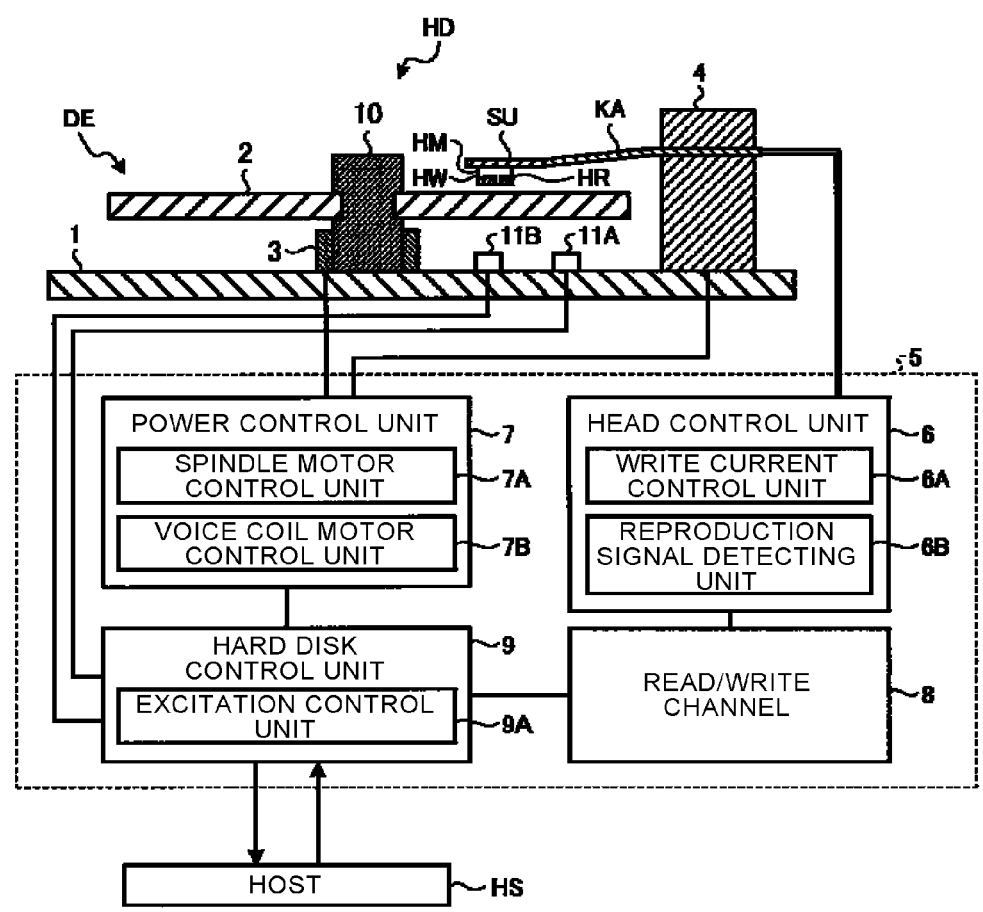
FIG. 1 is a block diagram illustrating a schematic configuration of a magnetic disk device according to a first embodiment.

FIG. 1 is a block diagram illustrating a schematic configuration of a magnetic disk device (HDD) as an example of a disk device according to a first embodiment.

In FIG. 1, a magnetic disk 2 is installed in the magnetic disk device, and the magnetic disk 2 is supported on a base 1 through a spindle 10. Further, a head slider HM is installed in the magnetic disk device, and a write head HW and a read head HR as a magnetic head are installed in the head slider HM. In addition, the write head HW and the read head HR are disposed to face the magnetic disk 2. Herein, the head slider HM is held over the magnetic disk 2 through a suspension SU and a carriage arm KA. The carriage arm KA may slide the head slider HM on a horizontal plane during seeking, and the like. The suspension SU applies a pressing force against a flying force of the magnetic head by a flow of air when the magnetic disk 2 rotates to the magnetic head so as to constantly maintain a fly height of the magnetic head on the magnetic disk 2. The suspension SU may be configured by a leaf spring.

Further, in the magnetic disk device, a voice coil motor 4 driving the carriage arm KA is installed, and a spindle motor 3 rotating the magnetic disk 2 is installed around the spindle 10. The voice coil motor 4 and the spindle motor 3 are fixed to the base 1. The base 1 may be configured by a die cast made of a metal such as aluminum (Al). Further, acceleration sensors 11A and 11B are installed in the magnetic disk device. The acceleration sensors 11A and 11B may be fixed to the base 1 and disposed at both sides of the carriage arm KA. The acceleration sensors 11A and 11B may be mounted on a substrate at a bottom side of the base 1. A processor, a memory, and an IC chip used in a control unit 5 may be mounted on the substrate. The head slider HM, the suspension SU, the carriage arm KA, the voice coil motor 4, the spindle motor 3, and the base 1 may constitute a disk enclosure DE.

A head control unit 6, a power control unit 7, a read/write channel 8, and a hard disk control unit 9 are installed in the control unit 5. The control unit 5 may control the positions of the write head HW and the read head HR for the magnetic disk 2 based on servo data read by the read head HR.

A write current control unit 6A and a reproduction signal detecting unit 6B are installed in the head control unit 6. A spindle motor control unit 7A and a voice coil motor control unit 7B are installed in the power control unit 7.

The head control unit 6 amplifies and detects a signal during reproduction of records. The write current control unit 6A controls write current that flows on the write head HW. The reproduction signal detecting unit 6B detects the signal read by the read head HR.

The power control unit 7 drives the voice coil motor 4 and the spindle motor 3. The spindle motor control unit 7A controls the rotation of the spindle motor 3. The voice coil motor control unit 7B controls the driving of the voice coil motor 4.

The read/write channel 8 transfers data between the head control unit 6 and the hard disk control unit 9. The data includes read data, write data, and servo data. For example, the read/write channel 8 converts the signal reproduced by the read head HR into a data format handled by a host HS and converts data output from the host HS into a signal format handled by the write head HW. The format conversion includes DA conversion, encoding, AD conversion, and decoding. Further, the read/write channel 8 decodes the signal reproduced by the read head HR or code-modulates the data output from the host HS.

The hard disk control unit 9 controls reproduction of records based on a command from the outside (e.g., the host HS) of the magnetic disk device or transfers the data between the outside and the read/write channel 8. A processor controlling the reproduction of the records and a processor controlling the transfer of the data between the host HS and the read/write channel 8 may be separately installed in the hard disk control unit 9. The same processor may be used for controlling the reproduction of the records and controlling the data transfer. As the processor, a CPU is used.

An excitation control unit 9A is provided in the hard disk control unit 9. The excitation control unit 9A may excite the magnetic head through the carriage arm KA. The magnetic head seeks during the excitation. Meanwhile, the seek described herein means moving the magnetic head between predetermined cylinders. Hereinafter, the seek during the excitation will be referred to as excitation seek. A reaction force by the excitation seek is transferred to the base 1 to move the position of the base 1 to a bracket 12 to be described below. In the excitation seek, data write or data read requested from the host HS is not performed in a seek location. The excitation seek is executed based on an internal command created in the excitation control unit 9A. In the excitation seek, the excitation control unit 9A may designate the cylinder of the seek location. Meanwhile, a seek in which the data write or data read by the request from the host HS is performed in the seek location is referred to as normal seek. The normal seek may be executed based on a read command or a write command issued from the host HS. In the case of the normal seek, the seek location (physical address) is designated based on logical block address (LBA) in the command from the host HS.

The control unit 5 is connected to the host HS. The host HS may be a personal computer that issues the write command or the read command to the magnetic disk device or a network which can be connected to a server, and the like. That is, the magnetic disk device is used as an external storage device of the host HS. The magnetic disk device may be externally attached to the host HS or embedded in the host HS.

When data is written in the magnetic disk 2, the magnetic disk 2 rotates by the spindle motor 3. Further, the write data designated by the write command from the host HS is transmitted to the read/write channel 8 through the hard disk control unit 9. In addition, the write data is written in an area designated by the write command of the magnetic disk 2 through the write head HW. Herein, when a write error occurs, the excitation control unit 9A executes the excitation seek to move the position of the base 1 in the bracket 12 to be described below. In addition, after the excitation seek, the normal seek may be executed, and the write of the data may be attempted in the seek location again.

Hereinafter, the method for correcting the attachment position of the magnetic disk device will be described in detail.

Figure 2A:
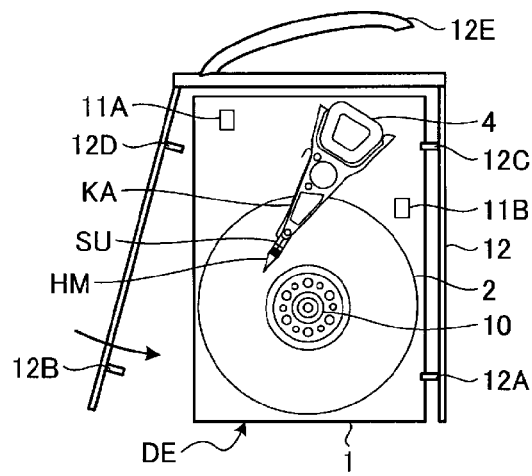
FIG. 2A is a plan view illustrating a method for attaching a bracket used in the magnetic disk device according to the first embodiment.
Figure 2B:
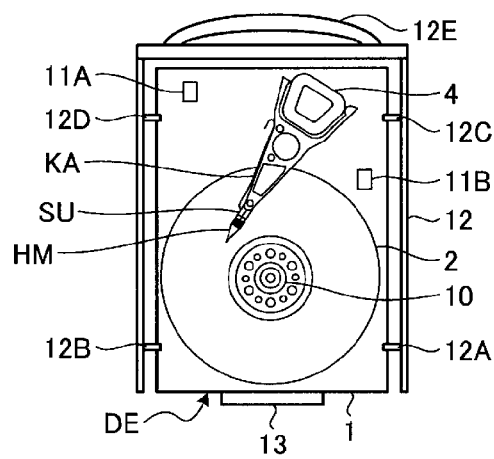
FIG. 2B is a plan view illustrating a state after attaching the bracket used in the magnetic disk device according to the first embodiment.
Figure 2C:
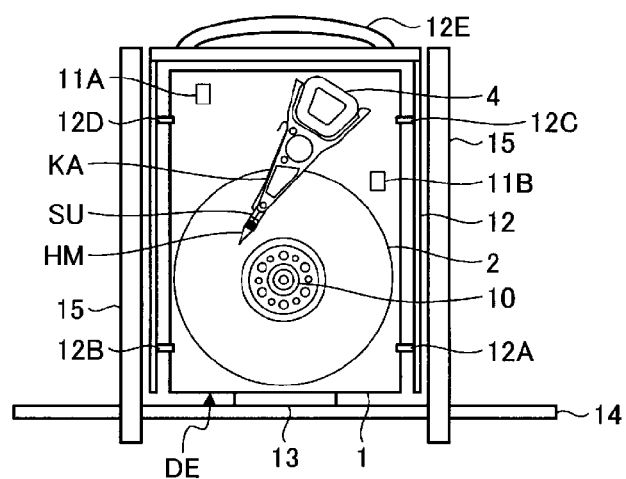
FIG. 2C is a plan view illustrating a state after the bracket used in the magnetic disk device is attached to a backplane of a PC or a storage system according to the first embodiment.

FIG. 2A is a plan view illustrating a method for attaching a bracket 12 used in the magnetic disk device according to the first embodiment. FIG. 2B is a plan view illustrating a state after attaching the bracket 12 to the magnetic disk device according to the first embodiment, and FIG. 2C is a plan view illustrating a state after attaching the bracket to the magnetic disk device or a backplane 14 of a PC or a storage system according to the first embodiment.

In FIG. 2A, the bracket 12 is mounted on the disk enclosure DE of the magnetic disk device. As a material of the bracket 12, for example, a resin may be used. The bracket 12 may facilitate attachment/detachment of the disk enclosure DE. A handle 12E may be installed in the bracket 12. Further, pins 12A to 12D are provided in the bracket 12.

Respective pins 12A to 12D are inserted into respective holes formed on a lateral surface of the base 1, and the disk enclosure DE is inserted into the bracket 12 to mount the bracket 12 on the disk enclosure DE as illustrated in FIG. 2B. By such a method, since the bracket 12 may be easily mounted on the disk enclosure DE, workability may be improved. However, when the bracket 12 is mounted on the disk enclosure DE, a gap may be generated between the holes of the base 1 and the pins 12A to 12D. Further, the force to insert the disk enclosure DE by the bracket 12 may be small. For this reason, when the disk enclosure DE vibrates, relative positions of the disk enclosure DE and the bracket 12 are changed, and as a result, the disk enclosure DE may contact the bracket 12. As illustrated in FIG. 2C, the bracket 12 mounted on the disk enclosure DE is fixed to the backplane 14. The disk enclosure DE is connected to the backplane 14 through a connector 13. The backplane 14 is fixed to a system frame 15. The system frame 15 may accommodate the disk enclosure DE.

Figure 3A:
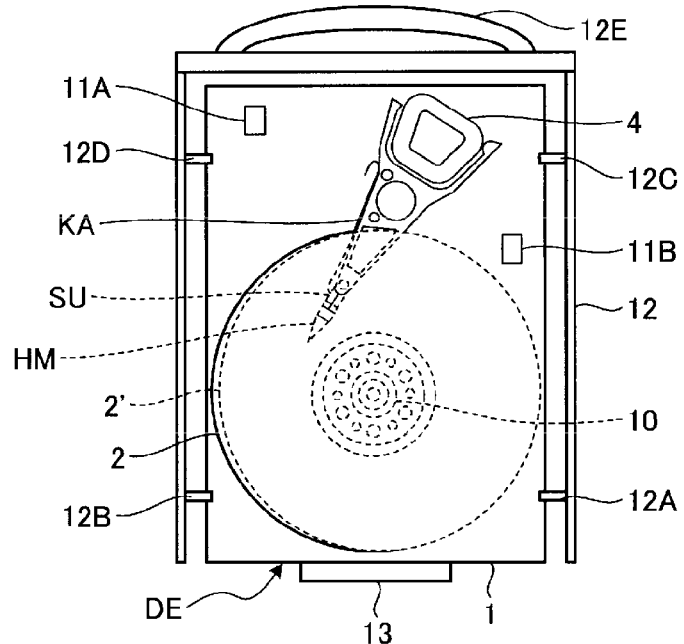
FIG. 3A is a plan view illustrating positional deviation of rotary centers of a magnetic disk and a spindle motor of the magnetic disk device according to the first embodiment.
Figure 3B:
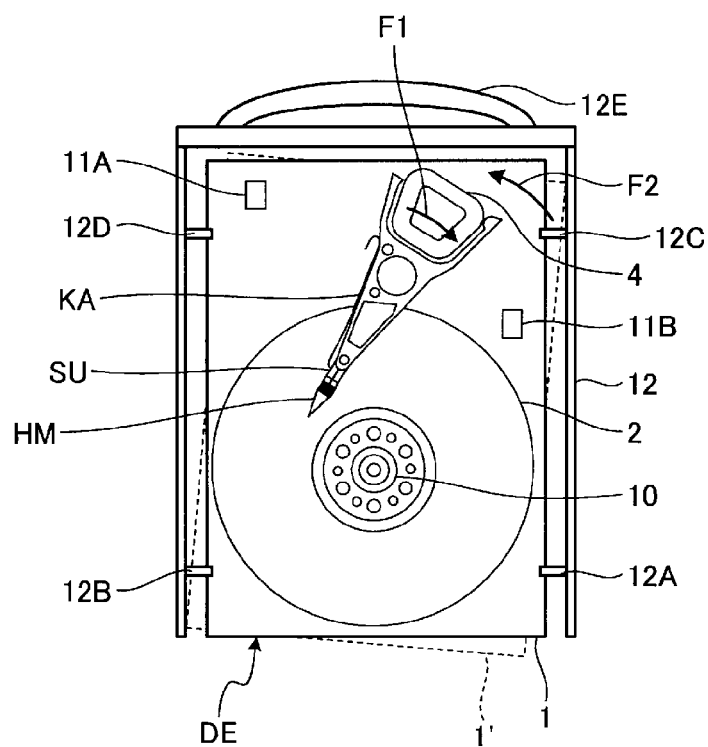
FIG. 3B is a plan view illustrating a method for generating a reaction force when correcting an attachment position of the magnetic disk device according to the first embodiment.

FIG. 3A is a plan view illustrating positional deviation of the center of a magnetic disk and a rotary center of a spindle motor in the magnetic disk device according to the first embodiment, and FIG. 3B is a plan view illustrating a method for generating a reaction force when correcting an attachment position of the magnetic disk device according to the first embodiment.

In FIG. 3A, it is assumed that the position of the magnetic disk 2 deviates from an initial position of the magnetic disk 2, and as a result, the magnetic disk 2 exists at the position of a magnetic disk 2'. In this case, the center of the magnetic disk 2' deviates from a rotational center of the spindle 10, and as a result, rotary synchronization vibration is generated in the magnetic disk 2'. The rotary synchronization vibration is vibration synchronized with the rotation of the spindle motor 3. In this case, since the disk enclosure DE is connected to the backplane 14 through the connector 13 (see FIG. 2), the disk enclosure DE vibrates around the connector 13. Meanwhile, the bracket 12 is fixed to the backplane 14. As a result, when the disk enclosure DE vibrates, the disk enclosure DE may contact the bracket 12.

When the material of the bracket 12 is stiff, a shock is generated in the disk enclosure DE by the contact with the bracket 12, and as a result, an error increases in positioning the magnetic head. The shock of the disk enclosure DE by the contact with the bracket 12 synchronizes with the rotation of the magnetic disk 2'. The magnetic head deviates from a radial target position (for example, the center of a track) of the magnetic disk 2' by the shock, and as a result, the data write may not be performed. In this case, even though the data write is retried after the magnetic disk 2' rotates one time, the same shock is generated, and as a result, the state in which the data write may not be performed may be repeated.

As illustrated in FIG. 3B, it is assumed that when the data write may not be performed, the position of the base 1 deviates from the initial position of the base 1, and thus, the base 1 exists at the position of a base 1'. When it is detected that the data write may not be performed, the excitation control unit 9A may execute the excitation seek. In the excitation seek, the current flows on the voice coil motor 4 to generate an excitation force F1, thereby exciting the magnetic head through the carriage arm KA. A reaction force F2 of the excitation force F1 is transferred to the base 1' to return the base 1' to the position of the base 1. Hereinafter, the current that flows on the voice coil motor 4 will be referred to as VCM current.

As a result, since the shock generated in the disk enclosure DE by the contact with the bracket 12 may be suppressed, the data write is retried after the excitation seek even when the data write is unsuccessful before the excitation seek, and as a result, the data write may be normally executed.

Figure 4A:
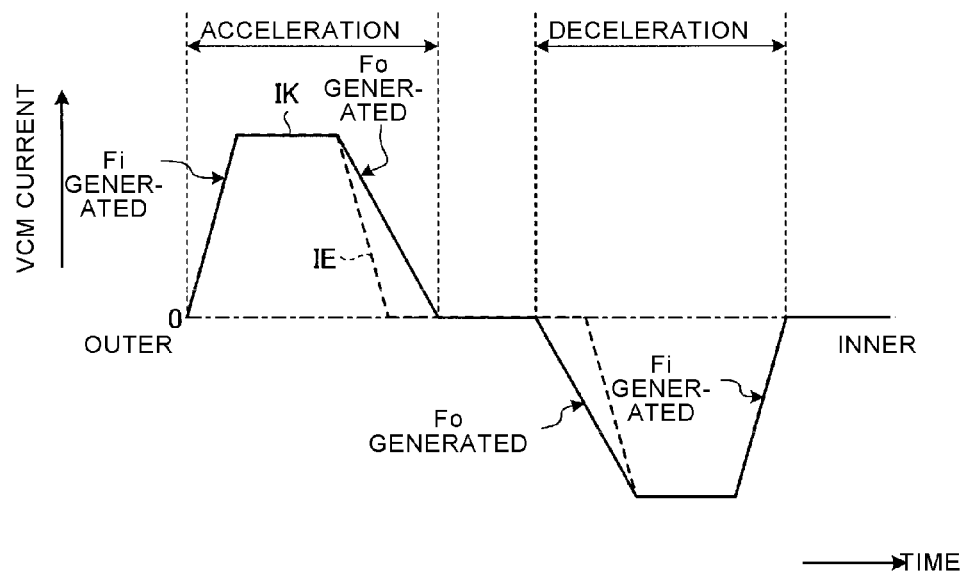
FIG. 4A is a diagram illustrating a profile of VCM current during inner excitation of the magnetic disk device according to the first embodiment.
Figure 4B:
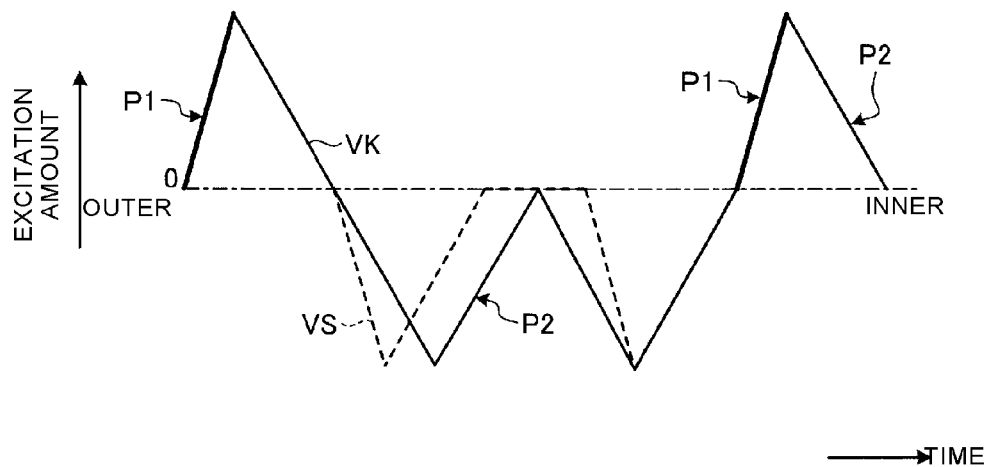
FIG. 4B is a diagram illustrating a profile of an excitation amount corresponding to the VCM current of FIG. 4A.

FIG. 4A is a diagram illustrating a profile of VCM current during inner excitation of the magnetic disk device according to the first embodiment, and FIG. 4B is a diagram illustrating a profile of an excitation amount corresponding to the VCM current of FIG. 4A. Inner excitation represents excitation seek from an outer side to an inner side. Further, in FIGS. 4A and 4B, when a value is smaller than 0, a direction of current or a force is reverse to a direction of current or a force in a case where the value is larger than 0. Further, a solid line represents a profile during the inner excitation, and a dotted line represents the profile during the normal seek.

In FIG. 4A, during the normal seek from the outer side to the inner side, at the time of acceleration, the VCM current IE rises and thereafter, maintains the same level during a predetermined period and thereafter, falls during acceleration. At the time of the deceleration, the VCM current IE falls and thereafter, maintains the same level during a predetermined period and then rises. The predetermined period may be determined based on a seek distance. During the normal seek at the time of the acceleration, a rising waveform and a falling waveform of the VCM current IE are symmetric to each other with respect to a change in a time axis. Further, even during deceleration, the rising waveform and the falling waveform of the VCM current IE are symmetric to each other with respect to the change in the time axis. In this case, as illustrated in FIG. 4B, profiles VS of excitation amounts during both the acceleration and the deceleration are symmetric to each other with respect to the change in the time axis.

Even in the inner excitation in the magnetic disk device according to the first embodiment, at the time of acceleration, the VCM current IK rises and thereafter, maintains the same level during a predetermined period and falls. At the time of the deceleration, the VCM current IK rises and thereafter, maintains the same level during a predetermined period and falls. During the inner excitation, at the time of acceleration, the rising waveform and the falling waveform of the VCM current IK are asymmetric to each other with respect to the change in the time axis. Further, even at the time of the deceleration, the rising waveform and the falling waveform of the VCM current IK are asymmetric to each other with respect to the change in the time axis. In this case, for example, a slope of the rising of the VCM current IK may be made the same as the slope of the rising of the VCM current IE during the normal seek. The slope of falling of the VCM current IK may be made smaller than the slope of the falling of the VCM current IE. In this case, in order to make the rising waveform and the falling waveform of the VCM current IK be asymmetric to each other with respect to the change in the time axis, the slope of the falling of the VCM current IE may be made smaller than that during the normal seek. When the slope of the falling of the VCM current IE is smaller than that during the normal seek, a driving force of the voice coil motor 4 need not increase, and as a result, a load required for driving the voice coil motor 4 may be reduced as compared with a method that makes the slope of the rising of the VCM current IE be larger than that during the normal seek.

As illustrated in FIG. 4A, an inner-direction excitation force Fi is generated during the rising of the VCM current IK at the time of the acceleration and the deceleration. Further, when the VCM current IK falls, an outer-direction excitation force Fo is generated. In this case, since the slope of the falling of the VCM current IK is smaller than the slope of the rising of the VCM current IE, the inner-direction excitation force Fi is larger than the outer-direction excitation force Fo. For this reason, the reaction force of each of the excitation forces Fi and Fo is transferred to the base 1 to move the base 1 in an outer direction during both the acceleration and the deceleration. In this case, as illustrated in FIG. 4B, profiles VK of excitation amounts during both the acceleration and the deceleration are asymmetric to each other with respect to the change in the time axis. In this case, in the profile VK, a P1 part has a larger slope than a P2 part.

For this reason, in the P1 part of the profile VK, a posture of the disk enclosure DE may be changed.

Figure 5A:
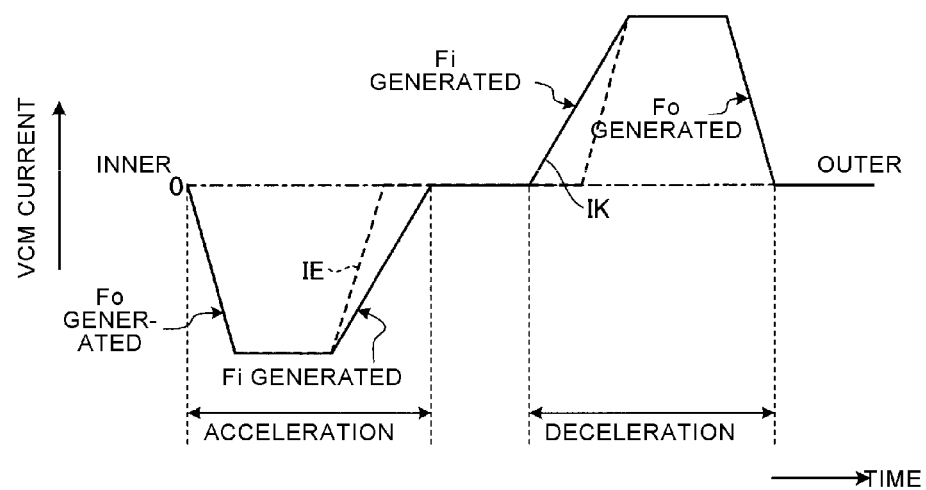
FIG. 5A is a diagram illustrating the profile of the VCM current during outer excitation of the magnetic disk device according to the first embodiment.
Figure 5B:
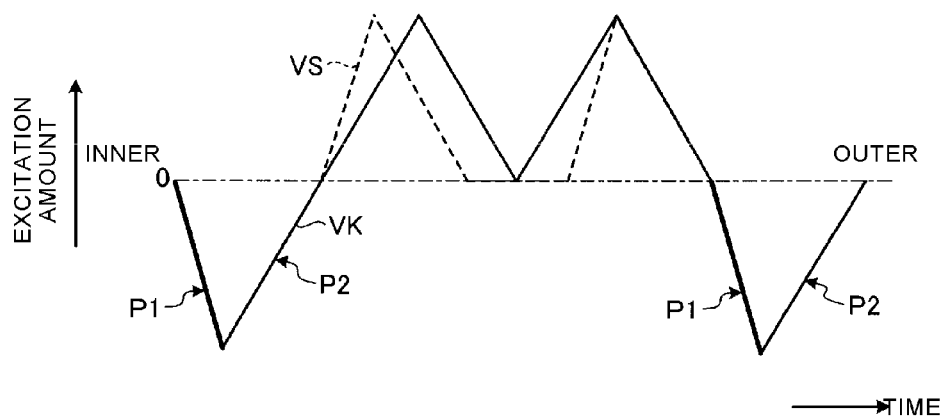
FIG. 5B is a diagram illustrating a profile of the excitation amount corresponding to the VCM current of FIG. 5A.

FIG. 5A is a diagram illustrating the profile of the VCM current during outer excitation of the magnetic disk device according to the first embodiment, and FIG. 5B is a diagram illustrating a profile of the excitation amount corresponding to the VCM current of FIG. 5A. Outer excitation represents excitation seek from the inner side to the outer side. Further, in FIGS. 5A and 5B, when the value is smaller than zero (0), the direction of the current or the force is reverse to the direction of the current or the force in the case where the value is larger than zero (0). Further, the solid line represents the profile during the inner excitation and the dotted line represents the profile during the normal seek.

In FIG. 5A, during the normal seek from the inner side to the outer side at the time of acceleration, the VCM current IE falls and thereafter, maintains the same level during a predetermined period and rises. At the time of the deceleration, the VCM current IE rises and thereafter, maintains the same level during a predetermined period and falls. During the normal seek at the time of the acceleration, a rising waveform and a falling waveform of the VCM current IE are symmetric to each other with respect to the change in the time axis. Further, even at the time of the deceleration, the rising waveform and the falling waveform of the VCM current IE are symmetric to each other with respect to the change in the time axis. In this case, as illustrated in FIG. 5B, the profiles VS of the excitation amounts during both the acceleration and the deceleration are symmetric to each other with respect to the change in the time axis.

Even in the outer excitation in the magnetic disk device according to the first embodiment, at the time of the acceleration, the VCM current IK falls and thereafter, maintains the same level during a predetermined period and rises. At the time of the deceleration, the VCM current IK rises and thereafter, maintains the same level during a predetermined period and falls. During the outer excitation at the time of the acceleration, the rising waveform and the falling waveform of the VCM current IK are asymmetric to each other with respect to the change in the time axis. Further, even at the time of the deceleration, the rising waveform and the falling waveform of the VCM current IK are asymmetric to each other with respect to the change in the time axis. In this case, for example, a slope of the falling of the VCM current IK may be made the same as the slope of the falling of the VCM current IE during the normal seek. The slope of the rising of the VCM current IK may be made smaller than the slope of the rising of the VCM current IE. In this case, in order to make the rising waveform and the falling waveform of the VCM current IK be asymmetric to each other with respect to the change in the time axis, the slope of the rising of the VCM current IE may be set to be smaller than that during the normal seek. When the slope of the rising of the VCM current IE is smaller than that during the normal seek, the driving force of the voice coil motor 4 need not increase, and as a result, the load required for driving the voice coil motor 4 may be reduced as compared with the method that makes the slope of the falling of the VCM current IE be larger than that during the normal seek.

As illustrated in FIG. 5A, the inner-direction excitation force Fi is generated during the rising of the VCM current IK at the time of the acceleration and at the time of the deceleration. Further, when the VCM current IK falls, the outer-direction excitation force Fo is generated. In this case, since the slope of the rising of the VCM current IK is smaller than the slope of the falling of the VCM current IE, the outer-direction excitation force Fo is larger than the inner-direction excitation force Fi. For this reason, either of at the time of the acceleration or at the time of the deceleration, the reaction force of each of the excitation forces Fi and Fo is transferred to the base 1 to move the base 1 in the inner direction. In this case, as illustrated in FIG. 5B, the profiles VK of the excitation amounts during both the acceleration and the deceleration are symmetric to each other with respect to a change in non-time axis. In this case, in the profile VK, the P1 part has a larger slope than the P2 part. For this reason, in the P1 part of the profile VK, the posture of the disk enclosure DE may be changed.

Figure 6:
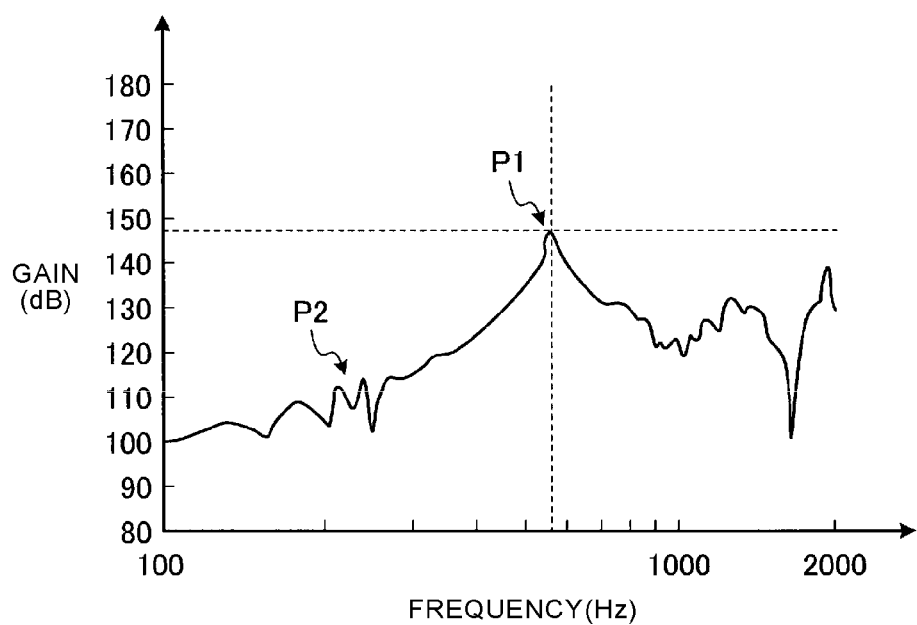
FIG. 6 is a diagram illustrating a transfer function of a rotational acceleration applied to the magnetic disk device according to the first embodiment.

FIG. 6 is a diagram illustrating a transfer function of a rotational acceleration applied to the magnetic disk device in a state in which the magnetic disk device is attached to a backplane of a PC or a storage system in the magnetic disk device according to the first embodiment.

In FIG. 6, the transfer function of the rotational acceleration exhibits a tendency that a gain slowly increases as a frequency increases. Since the gain of the P1 part of the profile VK of FIGS. 5A and 5B is larger than the gain of the P2 part, the excitation amount of the P1 part may be made larger than the excitation amount of the P2 part.

Figure 7:
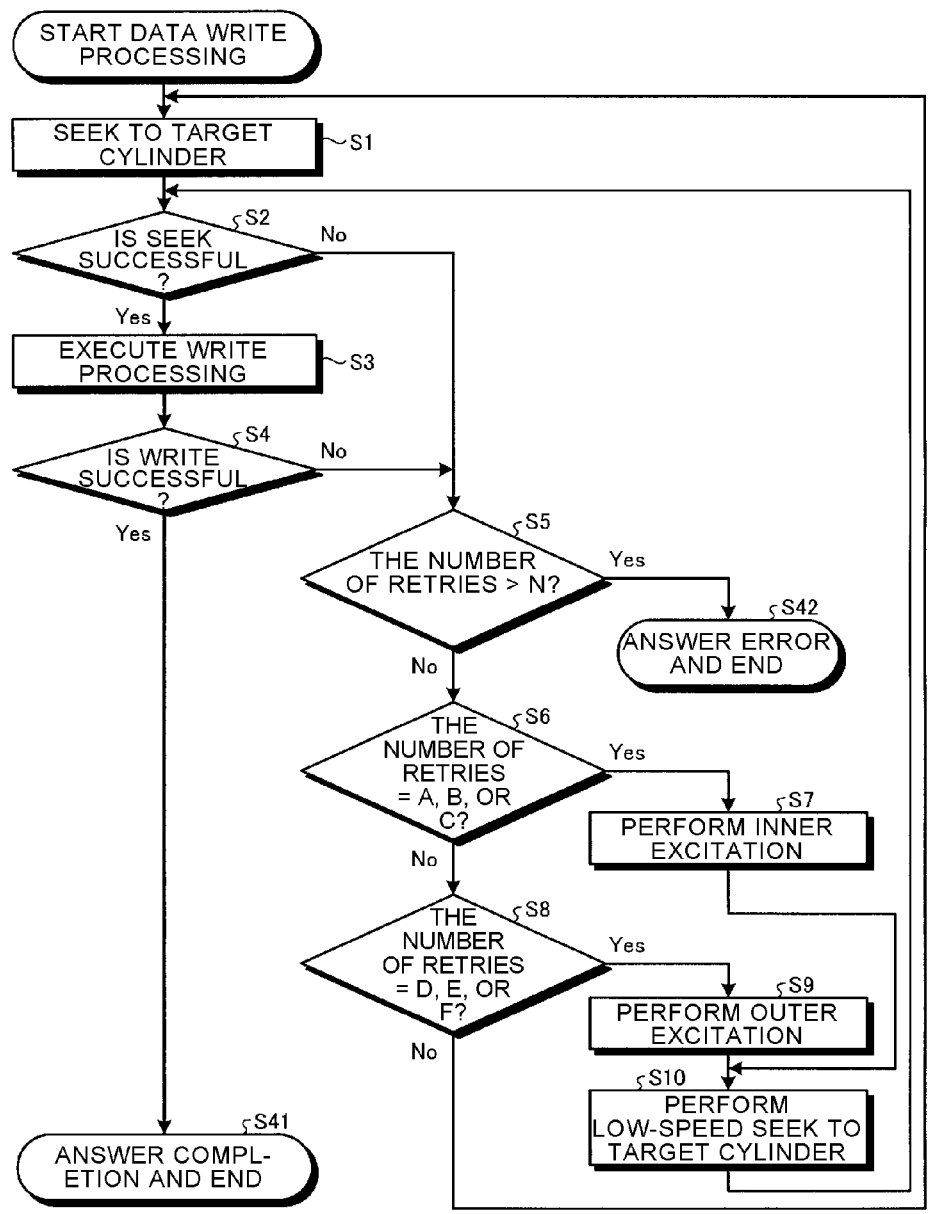
FIG. 7 is a flowchart illustrating an example of a method for correcting an attachment position of the magnetic disk device according to the first embodiment.

FIG. 7 is a flowchart illustrating an example of a method for correcting an attachment position of the magnetic disk device according to the first embodiment.

When the write command is transmitted from the host HS, the magnetic disk device starts data write processing to normally seek the magnetic head to a target cylinder (S1). Subsequently, the magnetic disk device determines whether the normal seek is successful (S2). When it is determined that the normal seek is successful (S2: YES), the magnetic disk device executes the data write processing (S3) and writes the write data in the target cylinder. Subsequently, the magnetic disk device determines whether the data write processing is successful (S4). When it is determined that the data write processing is successful (S4: YES), the magnetic disk device answers completion and ends the data write processing (S41).

Meanwhile, when it is determined that the normal seek is unsuccessful (S2: NO) or when it is determined that the data write processing is unsuccessful (S4: NO), it is determined whether the number of retries is larger than N (N is a positive integer) (S5). The number of retries is the number of re-execution times of the data write processing. When it is determined that the number of retries is larger than N (S5: YES), the error is answered, and the data write processing ends (S42). When it is determined that the number of retries is equal to or less than N (S5: NO), it is determined whether the number of retries is A, B, or C (A, B, and C represent different positive integers of N or less) (S6). When it is determined that the number of retries is A, B, or C (S6: YES), the inner excitation is performed (S7). As the number of retries A, B, or C, a value having a high possibility that unsuccessful data write processing will be caused by the rotary synchronization vibration RV may be selected. The rotary synchronization vibration synchronizes with the rotation of the spindle motor 3, and the retries is executed whenever the magnetic disk 2' rotates one time. As a result, when the data write processing is unsuccessful consecutively whenever the magnetic disk 2' rotates one time, it may be determined that the possibility that the unsuccessful data write processing will be caused by the rotary synchronization vibration RV is high. For this reason, the numbers of retries A, B, and C are preferably set to consecutive values of 2 or more. Further, in order to get away from the unsuccessful data write processing caused by the rotary synchronization vibration RV as early as possible, the numbers of retries A, B, and C are preferably set to as small values as possible.

Thereafter, after the low-speed seek is executed in the target cylinder (S10), the process returns to S2. The low-speed seek is seek which has a lower speed than either the normal speed or the excitation seek. After the excitation seek is performed, the low-speed seek is executed in order to move to the target cylinder to prevent the posture of the disk enclosure DE from being changed when moving to the target cylinder.

Meanwhile, when it is determined that the number of retries is not A, B, or C (S6: NO), it is determined whether the number of retries is D, E, or F (D, E, and F are different from each other and are positive integers of N or less different from A, B, and C) (S8). When it is determined that the number of retries is D, E, or F (S8: YES), the outer excitation is performed (S9). The numbers of retries D, E, and F are preferably set to values consecutive to the numbers of retries A, B, and C. Further, the numbers of retries D, E, and F are preferably set to consecutive values of 2 or more or as small values as possible similarly to the numbers of retries A, B, and C. Thereafter, after the low-speed seek is executed in the target cylinder (S10), the process returns to S2. Meanwhile, when it is determined that the number of retries is not D, E, or F (S8: NO), the process returns to S1.

In this case, for example, N=60, A=4, B=5, C=6, D=7, E=8, and F=9 may be set. For example, D, E, and F are set differently from A, B, and C to excite the disk enclosure DE in the inner direction or the outer direction according to the number of retries even when it is not known whether the disk enclosure DE deviates in the inner direction or the outer direction. As a result, the disk enclosure DE may move to a position where the data write may be normally performed. For example, when the data write processing may not be normally performed even though the inner excitation is executed several times, it may be determined that a movement direction of the disk enclosure DE by the inner excitation and a direction in which the position of the disk enclosure DE is corrected are opposite to each other. In this case, the outer excitation is executed instead of the inner excitation to make the movement direction of the disk enclosure DE by the outer excitation and the direction in which the position of the disk enclosure DE is corrected be the same as each other. Further, A, B, and C may be odd numbers or even numbers, or consecutive numbers of two times or more (this includes the example of three consecutive numbers as above).

FIG. 8 is a flowchart illustrating an operation of outer excitation of FIG. 7.

In FIG. 8, after the low-speed seek is executed in the inner direction (S11), the outer excitation is executed (S12). Subsequently, it is determined whether the outer excitation is executed n (n is a positive integer) times (S13). When it is determined that the outer excitation is not executed n times (S13: NO), the process returns to S11. When it is determined that the outer excitation is executed n times (S13: YES), the outer excitation ends.

FIG. 9 is a flowchart illustrating an operation of inner excitation of FIG. 7.

In FIG. 9, after the low-speed seek is executed in the outer direction (S31), the inner excitation is executed (S32). Subsequently, it is determined whether the inner excitation is executed n (n is a positive integer) times (S33). When it is determined that the inner excitation is not executed n times (S33: NO), the process returns to S31. When it is determined that the inner excitation is executed n times (S33: YES), the inner excitation ends.

Figure 10:
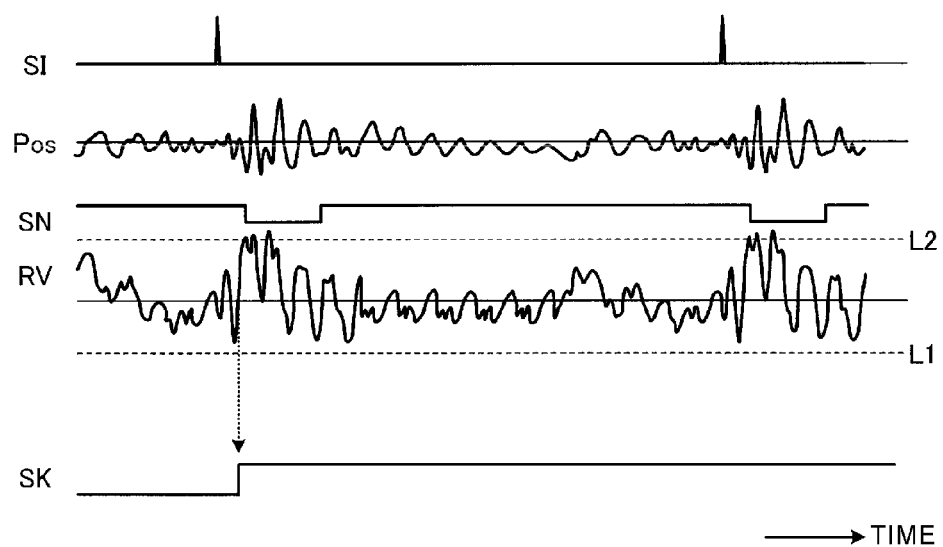
FIG. 10 is a diagram illustrating a shock wave form caused by a collision which synchronizes with rotation of the attachment member of the magnetic disk device and rotation of the magnetic disk device according to the first embodiment.

FIG. 10 is a diagram illustrating a rotary synchronization shock wave form caused by positional deviation of the magnetic disk of the magnetic disk device according to the first embodiment.

In FIG. 10, the magnetic disk 2 rotates in synchronization with a synchronization signal SI. In the synchronization signal SI, one pulse may be set every rotation of the magnetic disk 2. Further, the rotary synchronization vibration RV of the disk enclosure DE may be measured in synchronization with the rotation of the magnetic disk 2. The acceleration sensors 11A and 11B may be used for measuring the rotary synchronization vibration RV.

A positional error Pos for the target position of the magnetic head is changed according to the rotary synchronization vibration RV. When the positional error Pos is more than a predetermined level, an on-track signal SN is at a low level. The predetermined level may be set to a value when the magnetic head is off-tracked. The on-track signal SN represents that the magnetic head is normally positioned at the target position. Since the rotary synchronization vibration RV is periodically generated, when the rotary synchronization vibration RV is large, a state in which the data write may not be performed is repeated even though the data write is retried several times.

Herein, as for the size of the rotary synchronization vibration RV, a lower limit value L1 and an upper limit value L2 may be provided. The lower limit value L1 and the upper limit value L2 may be set by predicting a margin of the size of the rotary synchronization vibration RV when the data write is not able to be performed. In addition, when the size of the rotary synchronization vibration RV reaches the lower limit value L1 or the upper limit value L2, a shock detection signal SK rises. In addition, when the shock detection signal SK rises, the inner excitation or the outer excitation is executed.

Figure 11:
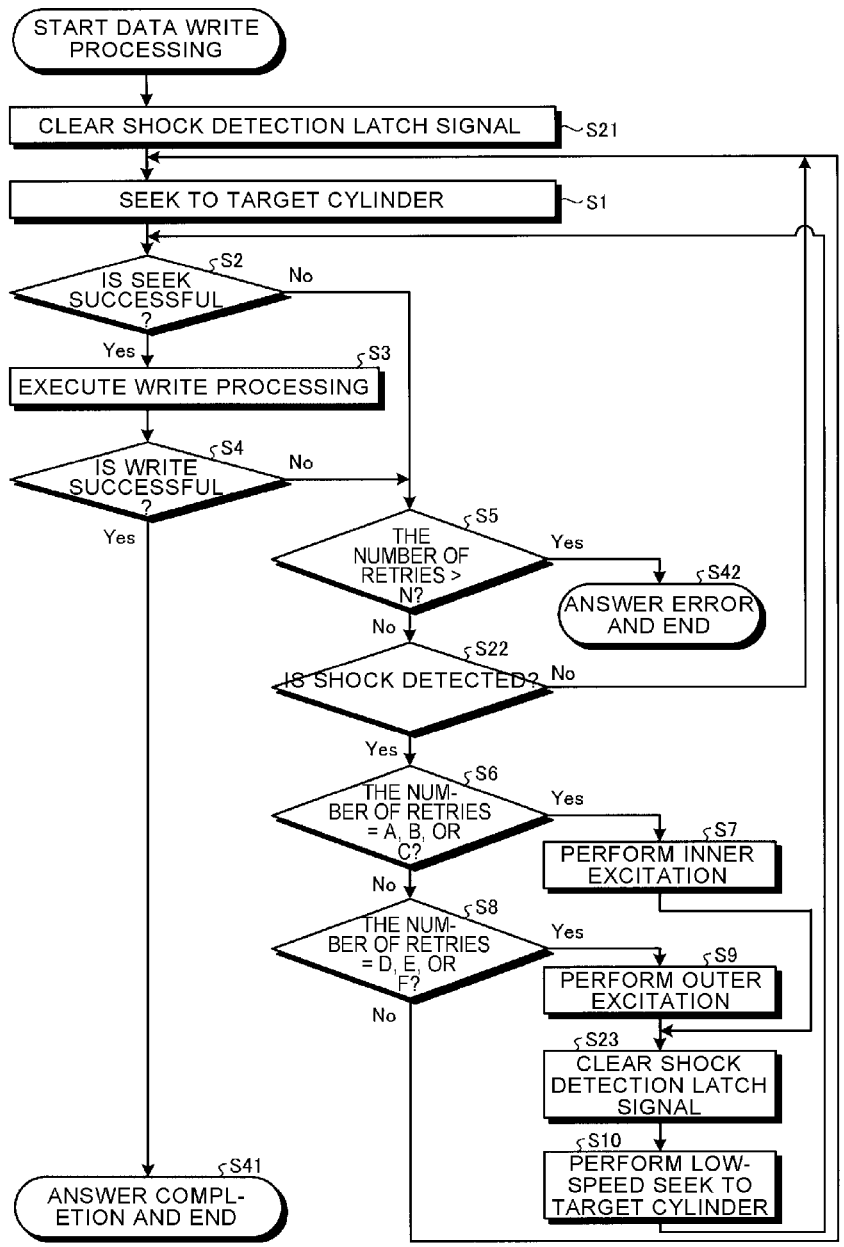
FIG. 11 is a flowchart illustrating another example of the method for correcting an attachment position of the magnetic disk device according to the first embodiment.

FIG. 11 is a flowchart illustrating another example of the method for correcting an attachment position of the magnetic disk device according to the first embodiment. Herein, in the method of FIG. 11, processing of detecting the shock detection signal SK is added to the method of FIG. 7 when it is determined whether the inner excitation or the outer excitation is executed. Accordingly, a different point from FIG. 7 is described. In this case, a comparator generating the shock detection signal SK by comparing the size of the rotary synchronization vibration RV and a reference value and a latch circuit generating a shock detection latch signal by latching the shock detection signal SK may be installed in the hard disk control unit 9 of FIG. 1. As for the reference value, the lower limit value L1 or the upper limit value L2 of FIG. 10 may be used.

In FIG. 11, when the magnetic disk device starts the data write processing, the magnetic disk device clears a shock detection latch signal held in the latch circuit before normally seeking the magnetic head to the target cylinder (S21). The shock detection latch signal may be cleared by firmware by the hard disk control unit 9. The shock detection latch signal is cleared to invalidate the previous shock detection signal SK and latch the next shock detection signal SK to the latch circuit.

In addition, when it is determined that the number of retries is equal to or less than N (S5: NO), the magnetic disk device determines whether the shock is detected based on the shock detection latch signal after the previous shock detection signal SK is cleared (S22). Herein, the shock detection signal SK detected by the acceleration sensors 11A and 11B are input into the comparator. In the comparator, the shock detection signal SK is compared with the reference value and when the shock detection signal SK reaches the reference value, the shock detection signal SK is changed from '0' to '1' and the value is latched to the latch circuit, and as a result, the shock detection latch signal is generated. That is, the magnetic disk device may determine whether the shock is detected by referring to the shock detection latch signal. When it is determined that the shock is detected (S22: YES), the process proceeds to S6. In addition, the inner excitation (S7) or the outer excitation (S9) is executed according to the number of retries and the shock detection latch signal is cleared (S23) and thereafter, the process proceeds to S10. When it is determined that the shock is not detected (S22: NO), the process returns to S1. Other operations are similar to the operations in the method of FIG. 7.

In the method of FIG. 7, even when the state in which the data write may not be performed is repeated due to a cause other than the rotary synchronization vibration RV, the inner excitation or outer excitation is executed. In this regard, in the method of FIG. 11, the inner excitation or the outer excitation is executed when the shock is detected. For this reason, when the state in which the data write may not be performed is repeated due to the cause other than the rotary synchronization vibration RV, the execution of the inner excitation or the outer excitation may be suppressed.

Second Embodiment

In the first embodiment, the profile of the VCM current different from that during the normal seek is used for correcting the posture of the disk enclosure DE, but in the second embodiment, the profile of the VCM current used for the normal seek is used in order to correct the posture of the disk enclosure DE. In this case, a profile corresponding to a distance at which the outer-direction or inner-direction excitation force increases among the profiles of the VCM current used for the normal seek is selected.

Figures 12A, 12B:
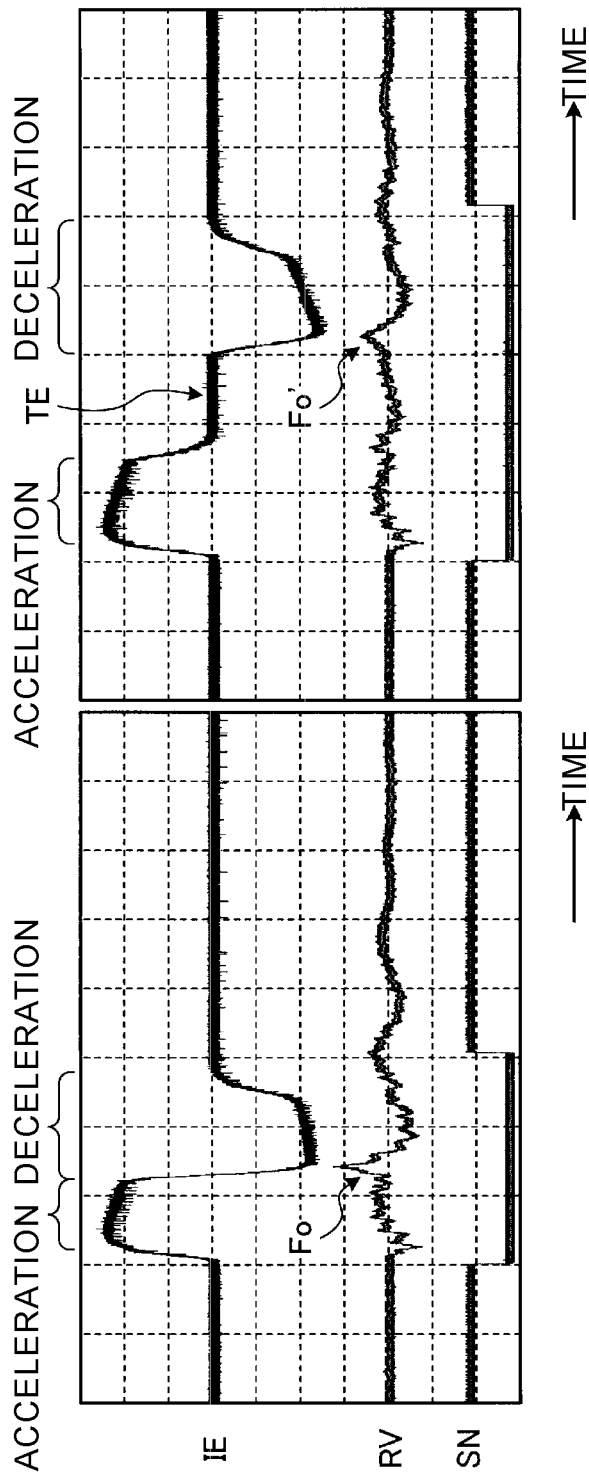
FIG. 12A is a diagram illustrating a profile of VCM current during inner-direction ⅓-stroke normal seek used for correcting an attachment position of a magnetic disk device according to a second embodiment.
FIG. 12B is a diagram illustrating the profile of the VCM current during inner-direction full-stroke normal seek of the magnetic disk device according to the second embodiment.

FIG. 12A is a diagram illustrating a profile of VCM current during inner-direction ⅓-stroke normal seek used for correcting an attachment position of a magnetic disk device according to a second embodiment, and FIG. 12B is a diagram illustrating the profile of the VCM current during inner-direction full-stroke normal seek of the magnetic disk device according to the second embodiment. Herein, a full stroke is a movement amount in which the seek distance is the largest. A ⅓ stroke is a movement amount where the seek distance is ⅓ of the full stroke.

In FIG. 12B, in a full-stroke normal seek, there is a constant velocity period TE during which neither the acceleration nor the deceleration is performed between the acceleration and the deceleration.

Meanwhile, in FIG. 12A, in the ⅓-stroke normal seek, there is no constant velocity period TE between the acceleration and the deceleration. In this case, when the acceleration and the deceleration are switched to each other, the VCM current consecutively falls. For this reason, the excitation force Fo of the ⅓-stroke normal seek may be larger than the excitation force Fo' of the full-stroke normal seek. The posture of the disk enclosure DE may be corrected by using the excitation force Fo.

Figure 13A:
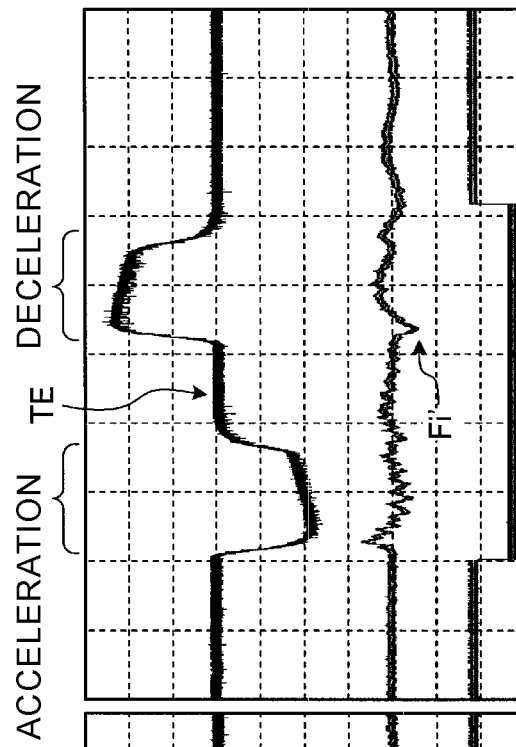
FIG. 13A is a diagram illustrating the profile of the VCM current during outer-direction ⅓-stroke normal seek used for correcting the attachment position of the magnetic disk device according to the second embodiment.
Figure 13B:
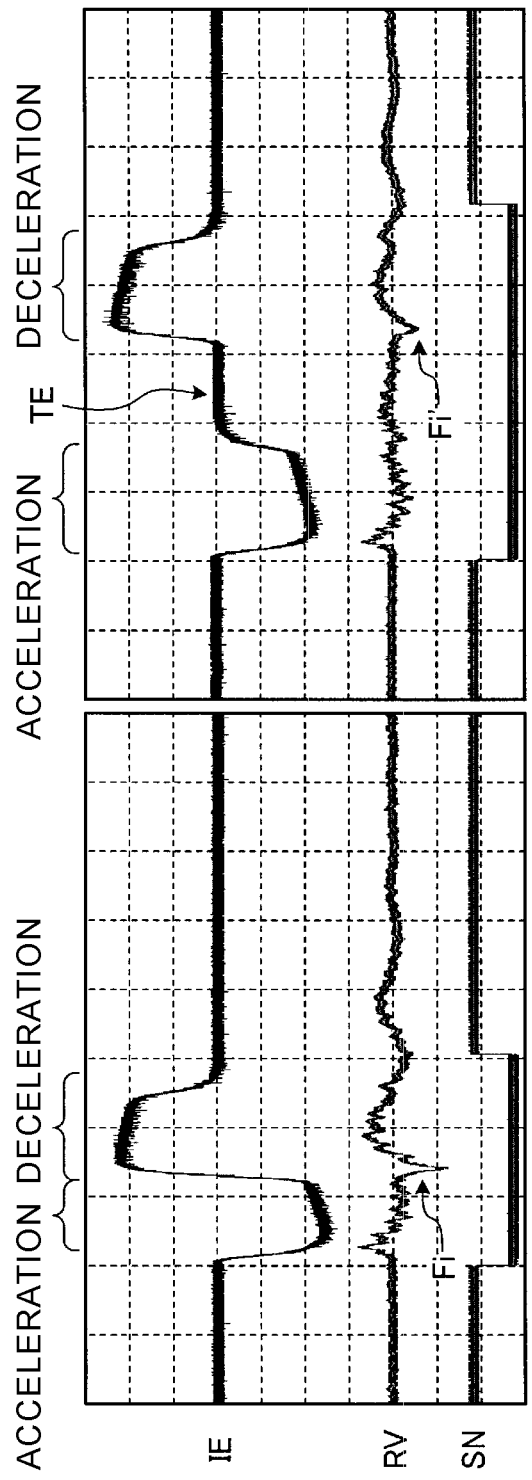
FIG. 13B is a diagram illustrating the profile of the VCM current during outer-direction full-stroke normal seek of the magnetic disk device according to the second embodiment.

FIG. 13A is a diagram illustrating the profile of the VCM current during outer-direction ⅓-stroke normal seek used for correcting the attachment position of the magnetic disk device according to the second embodiment, and FIG. 13B is a diagram illustrating the profile of the VCM current during outer-direction full-stroke normal seek of the magnetic disk device according to the second embodiment.

In FIG. 13B, in the full-stroke normal seek, there is the constant velocity period TE during which neither the acceleration nor the deceleration is performed between the acceleration and the deceleration.

Meanwhile, in FIG. 13A, in the ⅓-stroke normal seek, there is no constant velocity period TE between the acceleration and the deceleration. In this case, when the acceleration and the deceleration are switched to each other, the VCM current consecutively rises. For this reason, the excitation force Fi of the ⅓-stroke normal seek may be larger than the excitation force Fi' of the full-stroke normal seek. The posture of the disk enclosure DE may be corrected by using the excitation force Fi.

In the method of the second embodiment, since the profile suitable for the excitation is selected among the profiles of the VCM current used for the normal seek, an excitation seek-dedicated profile different from the profile of the VCM current used for the normal seek need not be prepared.

Third Embodiment

Figure 14:
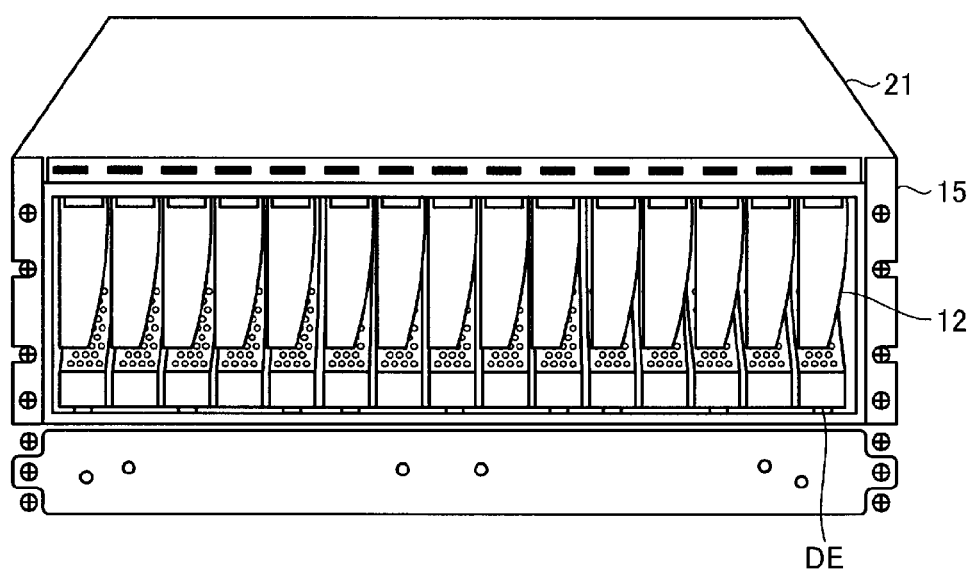
FIG. 14 is a perspective view illustrating a schematic configuration of a storage system in which a magnetic disk device according to a third embodiment is used.

FIG. 14 is a perspective view illustrating a schematic configuration of a storage system in which a magnetic disk device is used according to a third embodiment.

In FIG. 14, a plurality of disk enclosures DE is provided in a storage system 21. The disk enclosures DE may be accommodated in the system frame 15 side by side. The bracket 12 mounted on the disk enclosure DE is pushed into or drawn out from the system frame 15 to connect the disk enclosure DE to the connector 13. Herein, the disk enclosure DE may arbitrarily correct the posture of the disk enclosure DE to efficiently recover the data managed by the storage system 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for correcting mounting position of a disk device on a rack, the method comprising:
   performing a normal seek to position a head of the disk device above a target position on a disk;
   determining that the normal seek has failed; and
   performing an excitation seek that causes a position of a base supporting the disk to move and reposition the disk, wherein performing the excitation seek includes:
      performing a low-speed seek to position the head of the disk device above the target position on the disk, the low-speed seek being carried out at a slower speed than the normal seek; and
      driving a carriage arm that supports the head with a current having a first or second current profile to cause a reaction force to be applied to the base, the first or second current profile being different from a current profile used for the normal seek.

2. The method according to claim 1, wherein the low-speed seek is carried out in an outer-to-inner direction of the disk and the carriage arm is moved in an inner-to-outer direction of the disk by driving the carriage arm with the first current profile.

3. The method according to claim 1, wherein the low-speed seek is carried out in an inner-to-outer direction of the disk and the carriage arm is moved in an outer-to-inner direction of the disk by driving the carriage arm with the second current profile.

4. A method for correcting mounting position of a disk device on a rack, the method comprising:
performing a normal seek to position a head of the disk device above a target position on a disk;
determining that the normal seek has failed;
performing an excitation seek that causes a position of a base supporting the disk to move and reposition the disk; and
performing a low-speed seek to position the head of the disk device above the target position on the disk, the low-speed seek being carried out at a slower speed than the normal seek,
wherein the excitation seek is performed a predetermined number of times before performing the low-speed seek.

5. The method according to claim 4, further comprising:
tracking a number of times an attempt to position the head of the disk device above the target position on the disk has failed, wherein
responsive to determining that the failed number of times is a first predetermined number of times, performing the excitation seek in an outer-to-inner direction of the disk, and
responsive to determining that the failed number of times is a second predetermined number of times, performing the excitation seek in an inner-to-outer direction of the disk.

6. The method according to claim 5, wherein
responsive to determining that the failed number of times exceeds a threshold number of times, terminating the normal seek and returning an error.

7. A method for correcting a mounting position of a disk device on a rack, the method comprising:
performing a normal seek to position a head of the disk device above a target position on a disk;
determining that the normal seek has failed;
determining whether or not a shock event is recorded;
if the shock event is recorded,
performing an excitation seek that causes a position of a base supporting the disk to move and reposition the disk,
clearing the shock event, and
performing a low-speed seek to position the head of the disk device above the target position on the disk, the low-speed seek being carried out at a slower speed than the normal seek, and
tracking a number of times an attempt to position the head of the disk device above the target position on the disk has failed, wherein:
responsive to determining that the failed number of times is a first predetermined number of times and the shock event is recorded, performing the excitation seek in an outer-to-inner direction of the disk, and
responsive to determining that the failed number of times is a second predetermined number of times and the shock event is recorded, performing the excitation seek in an inner-to-outer direction of the disk.

8. A magnetic disk device comprising:
a magnetic disk;
a magnetic head;
a carriage arm supporting the magnetic head;
a voice coil motor configured to drive the carriage arm to position the magnetic head above a recording surface of the magnetic disk;
a base supporting the magnetic disk, the voice coil motor, and the carriage arm; and
a control unit configured to control a current to the voice coil motor to be supplied with a first current profile during a normal seek and with a second current profile during an excitation seek that causes a position of the base to move and reposition the disk.

9. The magnetic disk device according to claim 8, wherein, during the excitation seek, the control unit also performs a low-speed seek to position the head of the disk device above the target position on the disk, the low-speed seek being carried out at a slower speed than the normal seek.

10. The magnetic disk device according to claim 9, wherein the control unit is configured to perform after the excitation seek, a low-speed seek to position the head of the disk device above the target position on the disk, the low-speed seek being carried out at a slower speed than the normal seek.

11. The magnetic disk device according to claim 8, wherein the control unit is configured to carry out the excitation seek in one of two direction including an outer-to-inner direction of the disk and an inner-to-outer direction of the disk.

12. The magnetic disk drive according to claim 11, wherein
the control unit is configured to track a number of times an attempt to position the head of the disk device above the target position on the disk has failed, wherein
the excitation seek is performed in the outer-to-inner direction of the disk responsive to determining that the failed number of times is a first predetermined number of times, and the excitation seek is performed in the inner-to-outer direction of the disk responsive to determining that the failed number of times is a second predetermined number of times.

13. The magnetic disk device according to claim 8, wherein the control unit is configured to detect a shock event and to record the shock event upon detecting the shock event, and to carry out the excitation seek depending on whether or not the shock event is recorded.

14. The magnetic disk device according to claim 13, wherein the control unit is configured to carry out the normal seek and, if the normal seek failed and the shock event is not recorded, then repeat the normal seek without carrying out the excitation seek.

15. The magnetic disk device according to claim 13, wherein the control unit is configured to carry out the normal seek and, if the normal seek failed and the shock event is recorded, then carry out the excitation seek.

* * * * *